April 17, 1962 W. C. SAEMAN 3,030,094
ROTARY FURNACE INSTALLATIONS AND METHOD OF
PROCESSING CHARGES THEREIN
Original Filed June 21, 1955
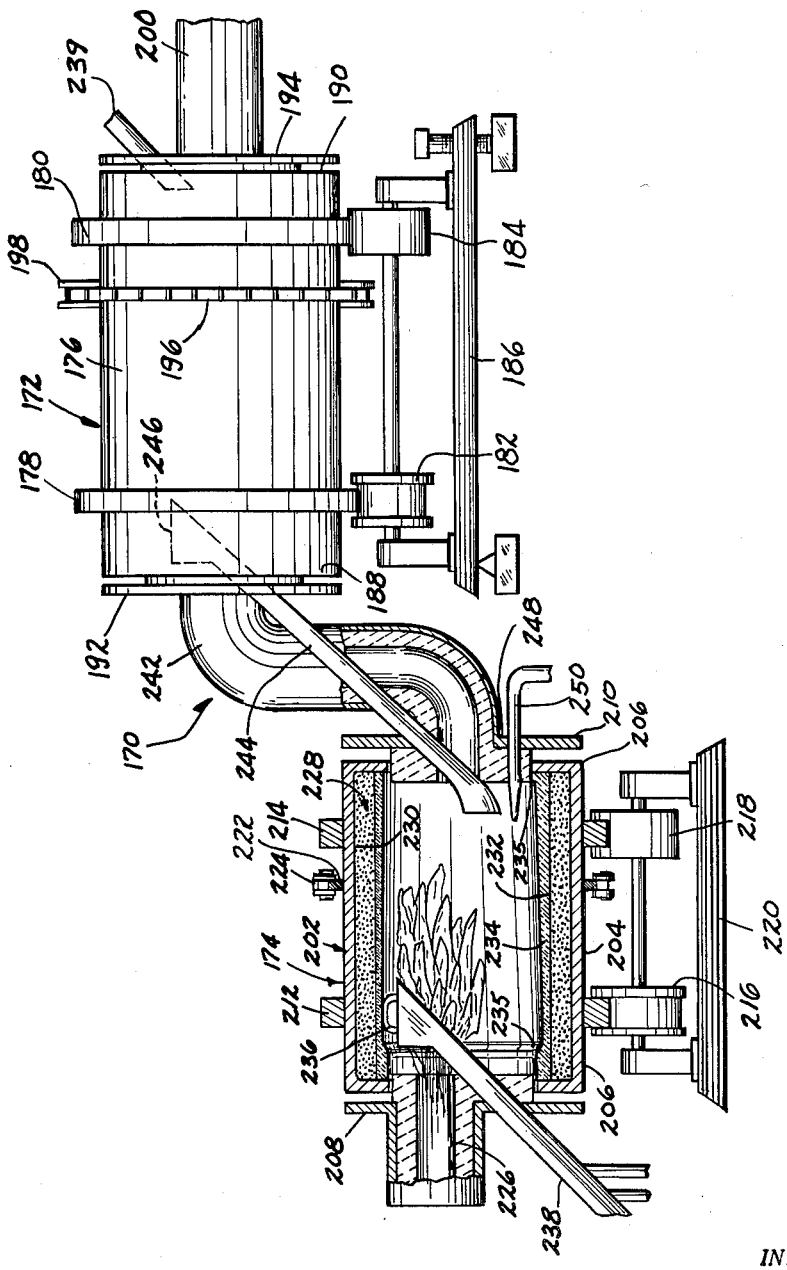
INVENTOR.
WALTER C. SAEMAN
BY Richard S. Strichler
ATTORNEY United States Patent Office 3,030,094
Patented Apr. 17, 1962

3,030,094
ROTARY FURNACE INSTALLATIONS AND METHOD OF PROCESSING CHARGES THEREIN
Walter C. Saeman, Lambert Road, Orange, Conn.
Original application June 21, 1955, Ser. No. 516,922, now Patent No. 2,878,004, dated Mar. 17, 1959. Divided and this application Oct. 21, 1958, Ser. No. 779,267
1 Claim. (Cl. 263—52)

This invention relates generally to furnace-type thermal operations, and more particularly to high heat-intensity thermal processes and refractory-lined furnaces therefor.

This application is a division of U.S. Patent 2,878,004, issued March 17, 1959 to W. C. Saeman, entitled "Rotary Furnace Installations and Method of Processing Charges Therein."

It is an object of the present invention to achieve a method of thermally fusing granular or lumpy solids in a continuous furnace operation the removal of the molten material in scoop fashion from the fusion chamber by holding a scoop-like extension of a discharge funnel or trough in the path of molten material clinging to and traveling with the spinning wall of the fusion chamber, thereby not only to achieve continuous and most efficient removal of the molten charge from the furnace, but also gain ready control over the continued retention of the desired concavity of the fusion chamber throughout, except at its inner semi-fused ridge formation which is cumulative and requires occasional removal of excess material by means of relatively short bars that may be passed into the furnace through the relatively cool feed-in end thereof and require only slight artificial cooling, if any.

A further object of the present invention is to make provisions in the aforementioned method of thermally fusing granular or lumpy solids in a continuous furnace operation, in the event that processing granular materials have sharply defined melting points and form melts of such high mobility as to cling to the spinning wall of the fusion chamber in a layer of insufficient thickness to permit removal of the molten charge in the aforementioned scoop fashion at the rate it is being produced, for increasing the consistency of the melt to the point where the layer thereof clinging to and traveling with the spinning wall of the fusion chamber is of sufficient thickness to permit scoop removal of the molten charge at the rate it is being produced, by lowering the temperature at the chamber wall portion leading to the scoop region thereof by means of an air jet or jets thereagainst in order to cause an increase in the viscosity of the molten material thereat, or, alternatively, by employing an air jet or jets to accelerate the flow of molten material on the wall of the fusion chamber in the direction of its rotation, or, further alternatively, by feeding a regulated amount of cool granulated process material directly into the fusion chamber to mix with the melt therein and thereby increase its consistency to the required extent.

Other objects and advantages will appear to those skilled in the art from the following, considered in conjunction with the accompanying drawing.

In the accompanying drawing:
The single FIGURE is a side-elevational view, partly in section, of a rotary furnace installation embodying the present invention.

The single figure shows a furnace installation 170 for preheating and fusing granular materials. This installation comprises dual furnaces 172 and 174 which may aptly be termed "preheat" and "fusion" furnaces, respectively. The preheat furnace 172 comprises a cylindrical furnace shell 176 having races 178 and 180 which ride on pairs of rotary rollers 182 and 184, respectively, on a base 186 for the support of the furnace shell for rotation about its longitudinal axis which, for a reason explained hereinafter, is inclined to the horizontal with the end 188 of the furnace lowermost. The open ends 188 and 190 of the furnace shell 176 are closed by fixed cover plates 192 and 194, respectively. Suitable means, including a sprocket 196 on the furnace shell and a chain 198, are provided for driving the furnace shell at variable speed. The cover plate 194 is provided with an exhaust conduit 200 through which to draw combustion products and other gaseous matter from the preheat furnace 172 and also induce their flow through the latter.

The fusion furnace 174 comprises a cylindrical furnace shell 202 having a peripheral wall 204 and opposite inwardly extending end flanges 206. Fixed cover plates 208 and 210 close the adjacent open ends of the furnace shell 202. The furnace shell 202 is also provided with spaced races 212 and 214 which ride on pairs of rotary rollers 216 and 218, respectively, on a base 220 for the support of the furnace shell for rotation about its longitudinal axis which in this instance may be disposed horizontally. Suitable means, including a sprocket 222 on the furnace shell and a chain 224, may be provided to drive the furnace shell 202 at variable speed, independently of the shell 176 of the preheat furnace 172, however. A suitable burner 226 extends through the cover plate 208 into the furnace shell 202, and its flame F'' is sustained by fuel and air suitably conducted to the burner.

Since a granular charge is to be fused in the furnace 174, its shell 202 is provided with a protective lining 228 which is preferably of loose unbonded granular thermal insulation and which is retained on the inner shell wall 230 by centrifugal force. To this end, the furnace shell 202 is preferably driven at a speed at which the centrifugal force of the inner lining surface 232 exceeds its gravitational force. Also, an impervious liner 234 of partly solidified and partly semi-fused matter will be permitted to form on the lining 228, either by permitting part of the latter, or the initial part of the granular charge, or both, to become fused by the heat from the flame F'' and then solidified, much in the manner explained in connection with the impervious bowl 76 in the furnace of FIG. 1, except that the present liner 234 need not be concave throughout but has opposite end constrictions 235 to confine the molten charge in the liner. The granular charge, which will be introduced into the fusion furnace 174 in a manner explained hereinafter and will melt in the liner 234 therein, is in its molten state drained from this furnace by scoop-up action of the inlet end 236 of a funnel 238 which extends through the cover plate 208 to the outside of the furnace for the discharge of the molten material thereat.

The granular charge to be fused is continuously fed into the preheat furnace 172 through a chute 239 which extends through the cover plate 194 at the uppermost end of the furnace shell 176. The furnace shell 176 is driven, independently of the fusion furnace 174, at such speed that the centrifugal force of its inner peripheral wall is substantially equal to its gravitational force. In thus driving the furnace shell 176 of the preheat furnace 172 and by virtue of the explained axial inclination of the same, it is obvious that the introduced granular charge therein will repeatedly cascade transversely thereof and also progressively longitudinally thereof toward the cover plate 192. The granular charge in the preheat furnace 172 will thus cascade counter to the flow of the hot combustion products and gases from the fusion furnace which are conducted into the preheat furnace 172 through a conduit 242 between the cover plates 210 and 192. In thus cascading counter to the hot combustion products and gases in the preheat furnace 172, the granules of the charge are brought into most intimate heat-exchange relation therewith and are thoroughly preheated to near their melting point so that they will unfailingly melt on their transfer from the preheat furnace 172 into the fusion furnace 174. This transfer of the preheated granules of the charge from the preheat furnace into the fusion furnace is achieved through a chute 244 which extends between the cover plates 192 and 210 and has inlet and discharge ends 246 and 248, respectively, in the preheat and fusion furnaces of which the inlet end 246 is so disposed and of such cross-sectional area as to receive substantially all of the cascading granules of the charge as they approach the chute.

As already mentioned, the preheated granules, once transferred into the fusion furnace 174, will quickly melt therein and the melt will continuously be removed therefrom through the funnel 238. In certain cases, care must be taken that the transferred granules will not accumulate in the fusion furnace adjacent the discharge end 248 of the chute 244 where they might fail to fuse at this comparative remoteness from the hot flame F″. To avoid this, recourse may be had, for instance, to an air jet or jets from a conduit 250 in the end cover 210, so directed as to scatter the preheated granules as they gravitate through the discharge end 248 of the chute 244.

If desired, or necessitated by heat conditions, the inner peripheral wall of the preheat furnace 176 may be provided with a lining of loose unbonded granular thermal insulation, in which case the furnace shell 176 is driven at a speed at which the centrifugal force of its inner lining surface is substantially equal to its gravitational force in order to activate the continuously fed charge therein into cascading therethrough as described.

What is claimed is:

In a method of continuously processing charge material in a substantially horizontal rotary furnace, the steps of introducing granular refractory material into the furnace, maintaining the position of the granular refractory material within the furnace by means of centrifugal force to form a mobile refractory liner, continuously supplying charge material at one end of the furnace, said charge material being supplied in solid form, maintaining the charge material in contact with the liner throughout the full internal circumference of the furnace by centrifugal force, heating the charge material while within the furnace to effect fusion thereof, continually withdrawing charge material in fused form from the opposite end of the furnace by selectively skimming the fused material only from the inner surface of the liner to a depth sufficient to maintain a diameter within the furnace at the discharge end which is greater than the corresponding diameter at any other position within the furnace whereby continuity and uniformity of flow of charge material through the furnace is maintained.

References Cited in the file of this patent

UNITED STATES PATENTS

| | | |
|---|---|---|
| 2,122,170 | Zotos | June 28, 1938 |
| 2,368,270 | Story | Jan. 30, 1945 |
| 2,694,565 | Sainderichin | Nov. 16, 1954 |
| 2,793,018 | Trombe | May 21, 1957 |
| 2,878,004 | Saeman | Mar. 17, 1959 |